2,042,654

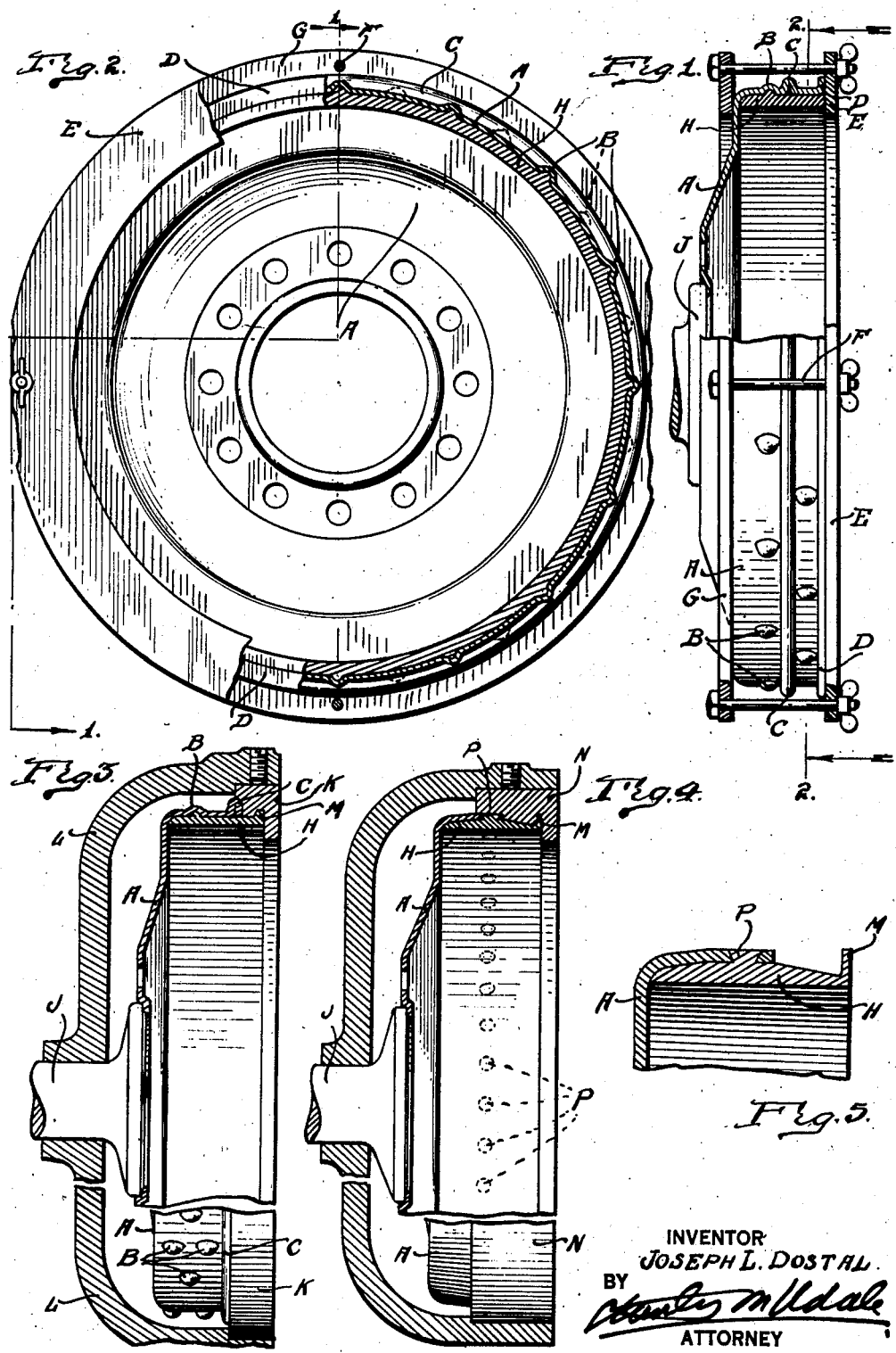
June 2, 1936.  J. L. DOSTAL  2,042,654
BRAKE DRUM
Original Filed Dec. 22, 1930
INVENTOR
JOSEPH L. DOSTAL
BY
ATTORNEY Patented June 2, 1936

UNITED STATES PATENT OFFICE 2,042,654

BRAKE DRUM

Joseph L. Dostal, Flint, Mich., assignor, by mesne assignments, to Kelsey-Hayes Wheel Company, Detroit, Mich., a corporation of Delaware Continuation of application Serial No. 504,043, December 22, 1930. This application June 20, 1932, Serial No. 618,296

2 Claims. (Cl. 188—218)

This invention relates to brake drums and method of making the same, the principal object being the provision of a composite brake drum of novel construction, and is a continuation of my application for Letters Patent of the United States for improvement in Method of making brake drums, filed December 22, 1930, Serial No. 504,043.

Another object is to provide a brake drum including a sheet metal drum structure forming a supporting means for an annular cast metal liner forming a braking surface.

Another object is to provide a brake drum including a sheet metal drum-like supporting structure having a cast metal liner mechanically interlocked therewith, and providing a braking surface.

Another object is to provide a composite brake drum including a drum-like sheet metal supporting member and a cast annular liner fused thereto, providing a braking surface.

Another object is the provision of a composite brake drum including a stamped sheet metal supporting member of drum-like shape provided with a cast metal liner both fused and mechanically interlocked therewith and providing a braking surface.

Another object is the provision of a composite brake including a stamped sheet metal supporting member of drum-like shape and an annular cast metal member providing a braking surface, the cast member being secured to and supported by the supporting member and projecting axially beyond the open end thereof.

Another object is to provide a composite brake drum structure of novel construction.

Another object is to provide a composite brake drum structure that is simple in construction and efficient in operation.

Another object is the provision of a novel method of forming a composite brake drum structure including a drum-like sheet metal supporting member and a cast metal liner providing a braking surface.

Another object is the provision of a method of forming a composite brake drum structure including a sheet metal supporting member and a cast metal liner and which liner is caused to be fused to the supporting member when cast in place therein.

Another object is the provision of a method of forming composite brake drum structure including a sheet metal supporting member and a cast metal liner which insures a maximum amount of heat transfer between the two.

Another object is the provision of a method of forming a composite brake drum structure including a sheet metal supporting drum and cast metal liner including the step of spinning the drum and pouring the molten liner material thereinto while the drum is spinning whereby to evenly distribute the cast metal about the inner periphery of the supporting member.

Another object is the provision of a method of forming a composite brake drum structure including providing a sheet metal drum-like supporting member, associating dam means therewith for retaining the molten metal to be applied thereto, spinning the supporting member, heating the supporting member, and then introducing molten metal thereinto while the supporting member is spinning.

The above being among the objects of the present invention the same consists in certain features of construction and combinations of parts, and certain steps of operation and of certain sequences of operation, to be hereinafter described with reference to the accompanying drawing, and then claimed, having the above and other objects in view.

In the accompanying drawing which illustrates suitable embodiments of the present invention and in which like numerals refer to like parts throughout the several different views:

Fig. 1 is a partially broken, partially sectioned, edge view of a brake drum constructed in accordance with the present invention and illustrating in connection with the same apparatus preferably employed in the production of the same.

Fig. 2 is a side elevational view of the structure shown in Fig. 1, certain parts thereof broken away and certain parts being shown in section to better illustrate the same.

Fig. 3 shows a view corresponding to Fig. 1 of an alternative method of manufacture and drum structure.

Fig. 4 shows a view corresponding to Fig. 1 of another alternative method of manufacture and structure.

Fig. 5 is an enlarged fragmentary sectional view taken radially through the brake drum shown in Fig. 4.

Referring to Figs. 1 and 2, A denotes a drum preferably formed from sheet metal to a cup-shaped configuration, and forming the supporting and main strength element of the final structure. The periphery of the drum is provided with a circumferentially extending annular, radially outwardly directed projecting portion, bead or flange C, approximately midway between its inner and outer edges. This rib or bead may be formed by any suitable operation such as rolling, pressing or the like and, as will be apparent, its formation provides on the inner periphery of the drum a corresponding annular groove or depression in radial alignment therewith, which serves as a means for aiding in the securement of the liner (which will presently be described) to the drum. As an additional aid in the securement of the liner to the drum, the drum is preferably provided on either side of the rib C with a plurality of circumferentially spaced radially outwardly extending projections B forming complementary depressions on the inner periphery of the drum. If desired, the open end of the drum may be provided with a radially outwardly directed annular flange D to impart additional stiffness to the structure.

H is a cast iron or other metallic liner, the inner surface of which is adapted to contact with and take the wear of the usual friction elements employed therewith for effecting the braking operation.

In Figs. 1 and 2 I have shown the brake drum just described in connection with the apparatus employed therewith for applying the liner H to the drum, and this apparatus includes a cover plate or dam E for retaining the molten metal from which the liner is formed, against escape in the pouring operation. G is an anchor ring or plate which embraces the side of the drum opposite the plate or ring E and which serves as means whereby the clamping bolts F may be employed for drawing the cover plate or dam E into firm contact with the open end of the drum A. J is a flanged shaft which is secured in axially concentric relation to the brake drum A and which may be rotated by any suitable means so that when the molten metal from which the liner H is to be made is introduced into the drum it will be thrown by centrifugal force into properly distributed relationship about the inner periphery thereof.

Whether or not the metal of the liner H is actually bonded to the metal of the drum A is of course a matter of choice for it will be apparent that although no bonding occurs the metal of the lining when cast into place will completely fill the groove on the inner side of the rib C and the depressions under the projections B, and this will mechanically interlock the liner to the drum so that no relative movement between these parts will occur in service. In either case when the liner is to be applied to the drum, the drum and its associated parts as indicated in Figs. 1 and 2 is rotated about the axis of the shaft J and the molten metal is introduced into the drum in any suitable manner, it being understood that due to the rotation of the brake drum, the molten metal will be thrown outwardly to the inner periphery of the brake drum and will be evenly distributed about it and wil retain this form when sufficiently cooled. Even though no bonding is possible or desired between the liner H and the brake drum, particularly where the metal of the liner is not of that type adapted to fuse to the drum, it is desirable to heat the drum before introducing the molten metal thereinto so that a more equal contraction of the drum and the liner will occur upon cooling of the metal. However, where the metal of the liner H is of a type capable of being readily fused to the drum, such for instance as cast iron or steel, then the drum is heated as by means of a torch or other suitable apparatus to a suitably high temperature before the molten metal is introduced thereinto, and under such conditions an actual fusion will occur between the drum and the metal of the liner.

Where fusion occurs between the drum and the liner it will be apparent that any heat generated in the liner due to a braking action thereon will have a more efficient path of heat transfer to the exterior of the drum where it is dissipated in the air surrounding the same and accordingly, it will be apparent that ordinarily such fused construction is preferable. It will also be apparent that by forming the rib C and projections B on the exterior of the drum, additional areas of heat transfer surface are provided therefor which enhance the cooling characteristics of the drum, and the rib D acts to reinforce the metal of the liner against expansion and/or distortion due to either heating of the drum during operation or to excessive braking pressures applied thereto.

In Fig. 3 a slightly different form of construction is disclosed. It will be noted that in this figure the rib C is formed at the open end of the drum A and the periphery of the drum between the rib C and the radially extending portion thereof is provided with a double row of spaced projections B the same as those previously described in connection with the construction shown in Figs. 1 and 2. In this particular case split molds K are supported in proper relation with respect to the drum by a cage L. The molds K are internally formed to effect an extension of the liner H at the open end of the drum A and may be further formed as indicated to provide a radially outwardly directed flange M at the outer or open end of the liner H. The operation of applying the liner H may be the same as that described in connection with the construction shown in Figs. 1 and 2.

A still further modification is illustrated in Figs. 4 and 5 in which the drum A is formed without the rib C or projection B as in the previous case, and in a manner similar to the construction illustrated in Fig. 3 the open end of the brake drum A terminates short of the open end of the completed brake drum, in this case to a greater extent than in the construction shown in Fig. 3, and the periphery of the drum A adjacent the open end thereof is provided with a plurality of circumferentially spaced openings C therein. Split molds N, similar to the split molds K described in conection with Fig. 3 and supported in a similar manner, are provided in this case, and extend over the openings P, and these openings are preferably tapered outwardly so that when the molten metal is introduced into the drum A to form the liner H the openings P will be filled with the molten metal which thus provides a dovetail connection between the lining and the drum which is particularly desirable where no fusion between these parts results. As in the case of the construction discussed in connection with Fig. 3, the molds N are preferably formed to produce a peripheral flange M at the open end of the liner H as best illustrated in Fig. 5.

It will be apparent that in the constructions illustrated in Figs. 3 to 5 inclusive, perhaps a more economical brake drum may be provided than in the construction illustrated in Figs. 1 and 2 for the reason that the amount of sheet metal in the drum A is reduced, the amount of drawing of this sheet metal is reduced, and direct contact between the liner H and the air which cools it is provided over a substantial portion of its surface, thus insuring more efficient cooling of that portion at least.

It will of course be apparent that after the molten metal which has been introduced into the drum to form the lining H has solidified the molding apparatus which has been provided in each case for confining the molten metal to its proper position, may be easily removed after which the brake drum assembly is in condition for machining, grinding, or any other operation that is required to bring it to a complete state.

Formal changes may be made in the specific embodiment of the invention described without departing from the spirit or substance of the broad invention, the scope of which is commensurate with the appended claims.

I claim:

1. A brake drum unit including a sheet metal drum having an annular reinforcing rib at its open end and having hollow projections extending radially outwardly from the drum intermediate its ends, and a liner received against and secured to the inner periphery of said sheet metal drum, said liner filling said hollow projections and extending axially beyond said sheet metal drum.

2. A brake drum unit including a sheet metal drum having an annular braking flange provided with an annular reinforcing rib at its open end and having a plurality of circumferentially spaced non-communicating hollow projections extending radially outwardly from the annular flange intermediate the opposite side edges thereof and a liner received against and secured to the inner periphery of the annular flange and filling the hollow projections aforesaid.

JOSEPH L. DOSTAL.